US009224029B2

(12) United States Patent
Setlak

(10) Patent No.: US 9,224,029 B2
(45) Date of Patent: Dec. 29, 2015

(54) ELECTRONIC DEVICE SWITCHABLE TO A USER-INTERFACE UNLOCKED MODE BASED UPON A PATTERN OF INPUT MOTIONS AND RELATED METHODS

(71) Applicant: Apple Inc., Cupertino, CA (US)

(72) Inventor: Dale R. Setlak, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 210 days.

(21) Appl. No.: 13/918,221

(22) Filed: Jun. 14, 2013

(65) Prior Publication Data

US 2014/0369572 A1 Dec. 18, 2014

(51) Int. Cl.
*H04M 1/68* (2006.01)
*G06K 9/00* (2006.01)
*G06F 21/32* (2013.01)

(52) U.S. Cl.
CPC ............ *G06K 9/00013* (2013.01); *G06F 21/32* (2013.01); *G06K 9/00899* (2013.01)

(58) Field of Classification Search
CPC ..... H04W 12/00; H04W 12/02; H04W 12/04; H04W 12/10; H04W 12/12; G06K 9/00013; G06K 9/00899; G06F 21/32
USPC .......................... 455/411, 575, 575.1; 726/16
See application file for complete search history.

(56) References Cited

U.S. PATENT DOCUMENTS

| 5,940,526 A | 8/1999 | Setlak et al. |
|---|---|---|
| 5,953,441 A | 9/1999 | Setlak |
| 6,289,114 B1 | 9/2001 | Mainguet |
| 6,927,581 B2 | 8/2005 | Gozzini |
| 7,082,214 B2 | 7/2006 | Nakano et al. |
| 7,361,919 B2 | 4/2008 | Setlak |
| 7,941,760 B2 | 5/2011 | Kocienda et al. |
| 8,006,099 B2 | 8/2011 | Aoyama et al. |
| 8,046,721 B2 | 10/2011 | Chaudhri et al. |
| 8,079,024 B2 | 12/2011 | White |
| 8,180,118 B2 | 5/2012 | Neil et al. |
| 8,754,745 B2 | 6/2014 | Wang et al. |
| 2008/0298649 A1* | 12/2008 | Ennis et al. ................... 382/125 |
| 2009/0083850 A1 | 3/2009 | Fadell et al. |
| 2009/0155456 A1 | 6/2009 | Benkley et al. |
| 2009/0316963 A1 | 12/2009 | Boshra |
| 2010/0225607 A1 | 9/2010 | Kim |
| 2011/0002461 A1 | 1/2011 | Erhart et al. |
| 2011/0175703 A1 | 7/2011 | Benkley, III |
| 2012/0075452 A1 | 3/2012 | Ferren |
| 2014/0026208 A1* | 1/2014 | Coons .............................. 726/16 |

FOREIGN PATENT DOCUMENTS

TW 201137658 1/2011

* cited by examiner

*Primary Examiner* — Amancio Gonzalez
(74) *Attorney, Agent, or Firm* — Allen, Dyer, Doppelt, Milbrath & Gilchrist, P.A.

(57) ABSTRACT

An electronic device may include a finger biometric sensor, a display, and a processor coupled to the finger biometric sensor and the display. The processor may be switchable between a user-interface locked mode and a user-interface unlocked mode. The processor may be capable of determining a pattern of input motions on the finger biometric sensor and displaying an image on the display corresponding to the pattern of input motions. The processor may also be capable of switching between the user-interface locked mode and the user-interface unlocked mode when the pattern of input motions matches a stored pattern representing a user unlock code.

26 Claims, 11 Drawing Sheets

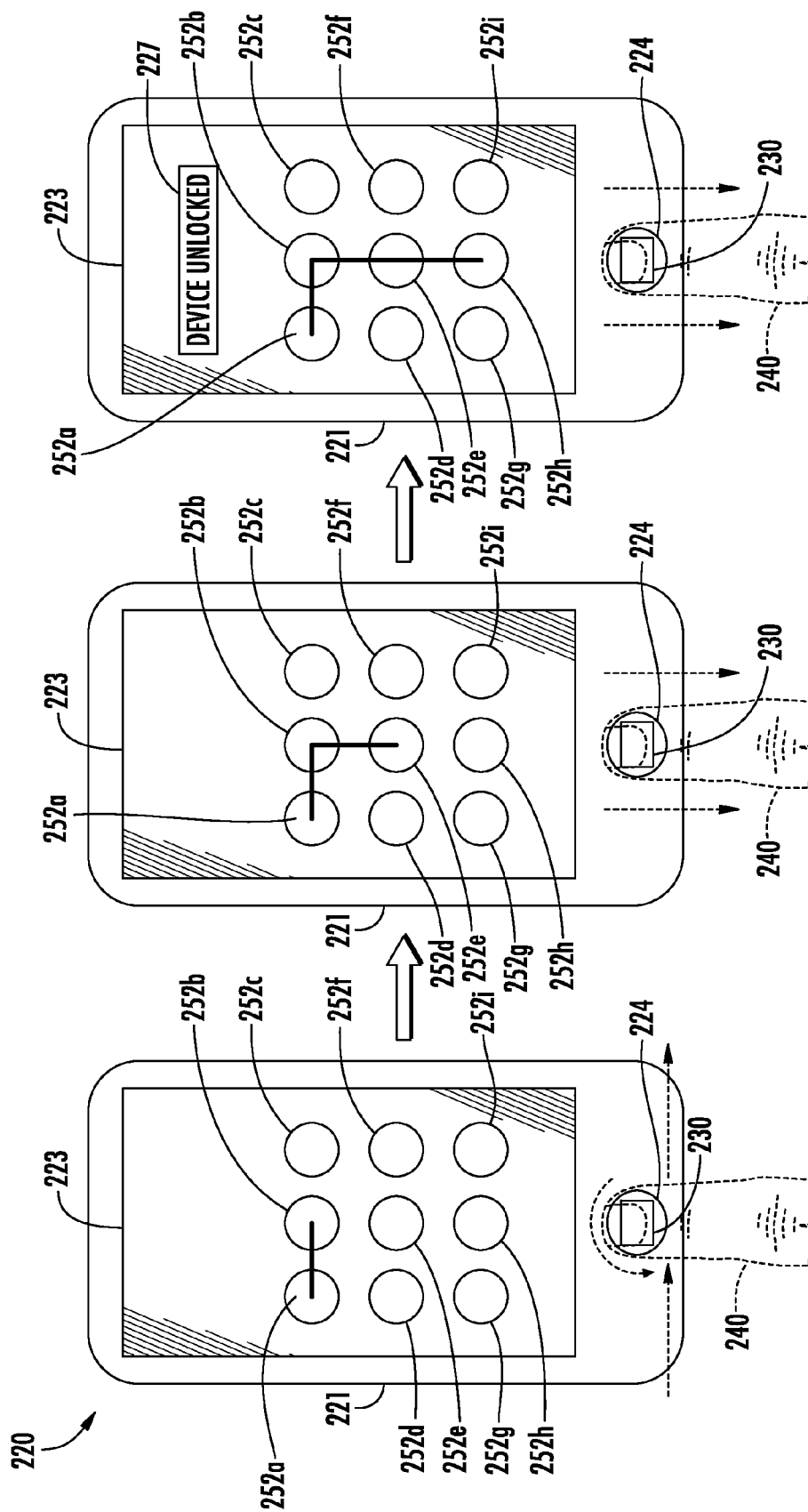

ELECTRONIC DEVICE SWITCHABLE TO A USER-INTERFACE UNLOCKED MODE BASED UPON A PATTERN OF INPUT MOTIONS AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference, discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. Other fingerprint sensors, for example, a multi-function smart sensor expands touch-based functionality of touchscreen and QWERTY smartphones with a reduced impact on sensor performance or durability. Thus, a fingerprint sensor may be particularly advantageous for providing more convenient access to the electronic device without a password, for example, and, more particularly, without having to type the password, which is often time consuming.

U.S. Patent Application Publication No. 2011/0175703 to Benkley, III discloses an electronic imager using an impedance sensor grid array mounted on or about a switch. More particularly, Benkley, III discloses a switch being incorporated into a sensor assembly that allows integration of sensor operations, such as, fingerprint sensor operations. A fingerprint sensor can be used for authentication while being used together with a power switch or navigation selection switch. The authentication may be used to access the device entirely or access different levels of information.

U.S. Pat. No. 8,006,099 to Aoyama et al. discloses a portable terminal device, for example, a phone that includes a fingerprint sensor. An authentication unit may cooperate with the fingerprint sensor to unlock the device based upon a fingerprint authentication, a personal identification number (PIN) code, or a combination of a fingerprint authentication and the PIN code.

U.S. Pat. No. 8,046,721 to Chaudhri et al. discloses unlocking of a device by performing gestures on an unlocking image. More particularly, a device with a touch-sensitive display is unlocked if contact with the display corresponds to a predefined gesture for the unlocking device.

SUMMARY OF THE INVENTION

In view of the foregoing background, it is therefore an object of the present invention to provide an electronic device having enhanced security and with convenient access.

This and other objects, features, and advantages in accordance with the present invention are provided by an electronic device that may include a finger biometric sensor and a display. The electronic device may also include a processor coupled to the finger biometric sensor and the display and being switchable between a user-interface locked mode and a user-interface unlocked mode. The processor may be capable of determining a pattern of input motions on the finger biometric sensor and displaying an image on the display corresponding to the pattern of input motions. The processor may also be capable of switching between the user-interface locked mode and the user-interface unlocked mode when the pattern of input motions matches a stored pattern representing a user unlock code. Accordingly, the electronic device advantageously switches to a user-interface unlocked mode based upon a match of the input motions to the finger biometric sensor with a stored pattern representing a user unlock code. Thus, the electronic device may more quickly switch to the user-interface unlocked mode and while using the finger biometric sensor, for example which may also acquire finger biometric data based upon the input motions.

The processor may be capable of determining spoof detection data based upon the pattern of input motions, for example. The spoof detection data may include distortion data, for example.

The processor may be capable of displaying the image on the display as a virtual combination lock responsive to the pattern of input motions. The stored pattern representing the user unlock code may include a series of rotational movements, for example. The stored pattern representing the user unlock code may include a series of linear movements, for example. The processor may be capable of acquiring finger biometric match data and comparing the finger biometric match data with stored finger biometric enrollment data.

The electronic device may further include a user input device coupled to the processor. The processor, when in the user-interface unlocked mode, may be capable of performing a corresponding device function responsive to the user input device, for example. The user input device may include a finger-operated input device carrying the finger biometric sensor, for example. The electronic device may also include a wireless transceiver coupled to the processor.

A method aspect is directed to a method of switching between a user-interface locked mode and a user-interface unlocked mode of an electronic device that includes a finger biometric sensor, a display, and a processor coupled to the finger, biometric sensor and the display. The method may include using the processor to determine a pattern of input motions on the finger biometric sensor and display an image on the display corresponding to the pattern of input motions. The method may also include using the processor to switch between the user-interface locked mode and the user-interface unlocked mode when the pattern of input motions matches a stored pattern representing a user unlock code.

BRIEF DESCRIPTION OF THE DRAWINGS

FIGS. 11a-11c are plan views of the electronic device of FIG. 10 displaying an image corresponding to a series of linear movements.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation are used to indicate like elements in different embodiments.

Figure 1:
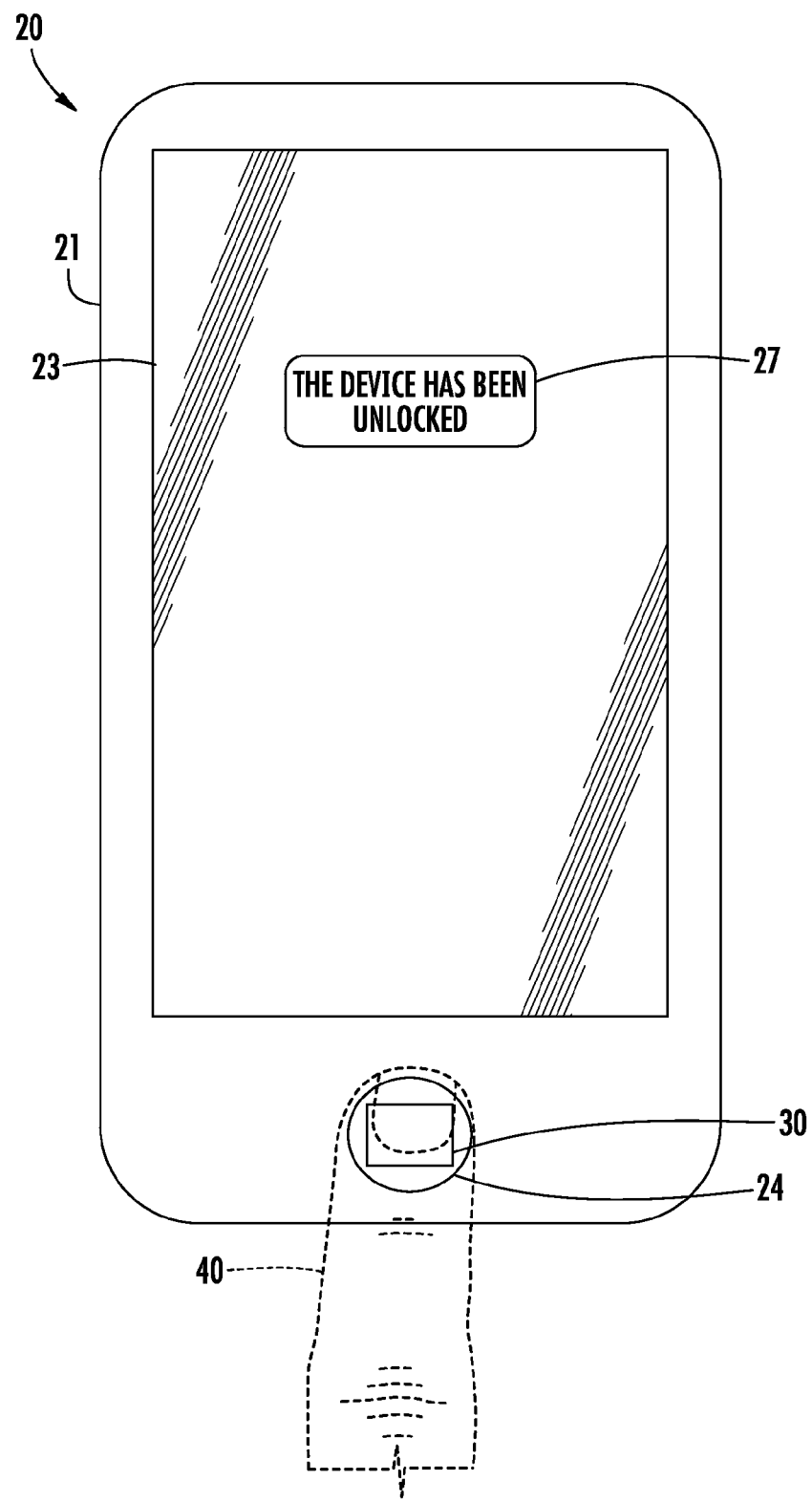
FIG. 1 is a plan view of an electronic device according to the present invention.
Figure 2:
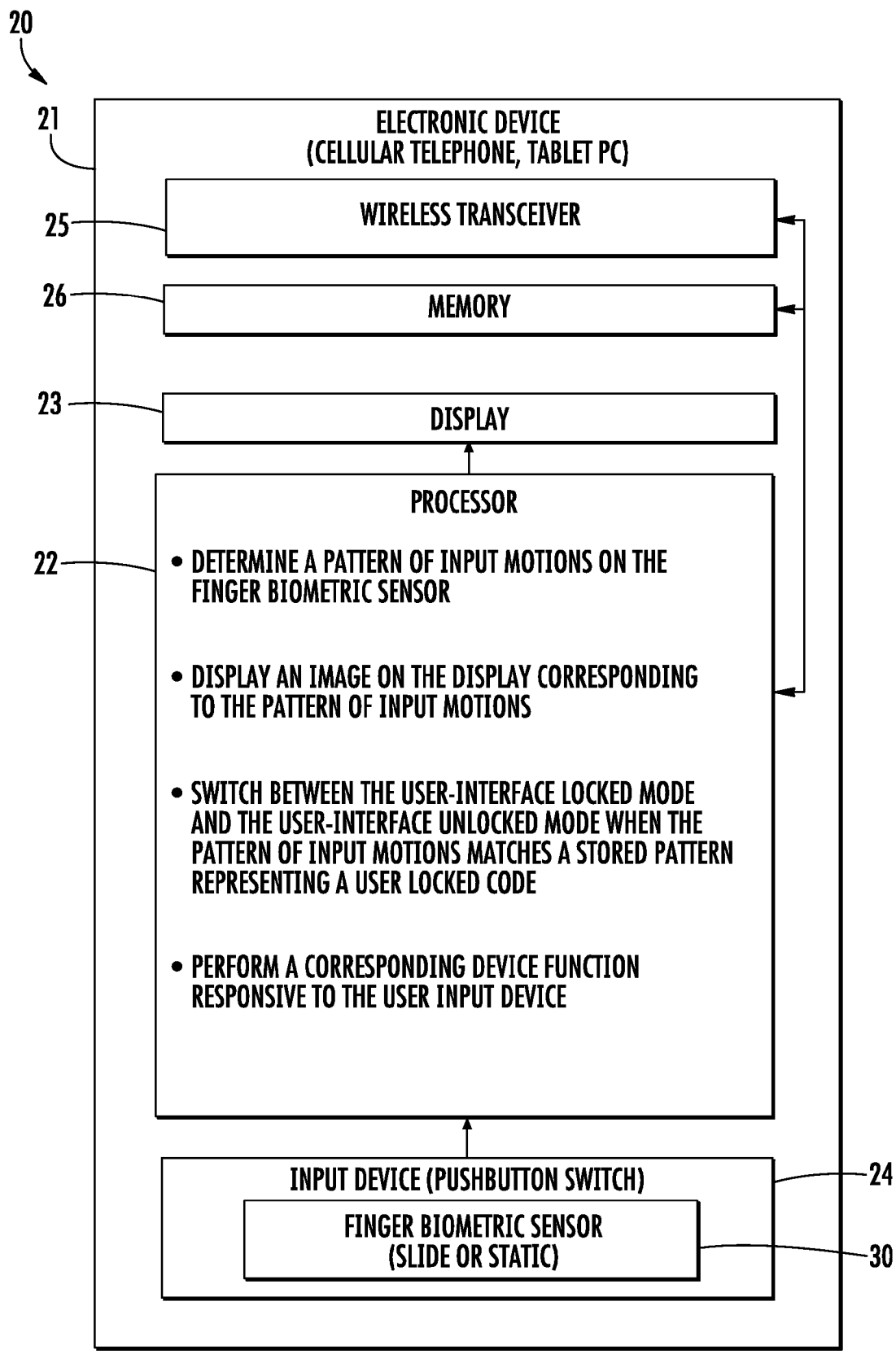
FIG. 2 is a schematic block diagram of the electronic device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 (e.g. cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The processor 22 is switchable between a user-interface locked mode and a user-interface unlocked mode. More particularly, in the user-interface locked mode, the processor 22 may restrict corresponding device operations of the pushbutton switch 24 or other user input device. For example, in the user-interface locked mode, operation of the pushbutton switch may turn on the display 23 with a message that the device is locked, while in the user-interface unlocked mode, operation of the pushbutton switch may perform the corresponding device function, for example, a home function, as noted above. Of course, in the user-interface locked mode additional or other user-input devices may be inoperative or may not perform the corresponding function as in the user-interface unlocked mode.

A finger biometric sensor 30 is carried by the pushbutton switch 24 to sense a user's finger 40 or an object placed adjacent the finger biometric sensor. The finger biometric sensor 30 is carried by the pushbutton switch 24 so that when a user contacts and/or presses downward on the pushbutton switch, data from the user's finger 40 is acquired, for example, for finger matching and/or spoof detection, as will described in further detail below. In other words, the finger biometric sensor 30 may be responsive to static contact or placement of the user's finger 40 or object. Of course, in other embodiments, for example, where the finger biometric sensor 30 is not carried by a pushbutton switch, the finger biometric sensor may be a slide sensor and may be responsive to sliding contact, or the finger biometric sensor may be a standalone static placement sensor. The finger biometric sensor 30 may also be carried adjacent the display 23.

Figure 3:
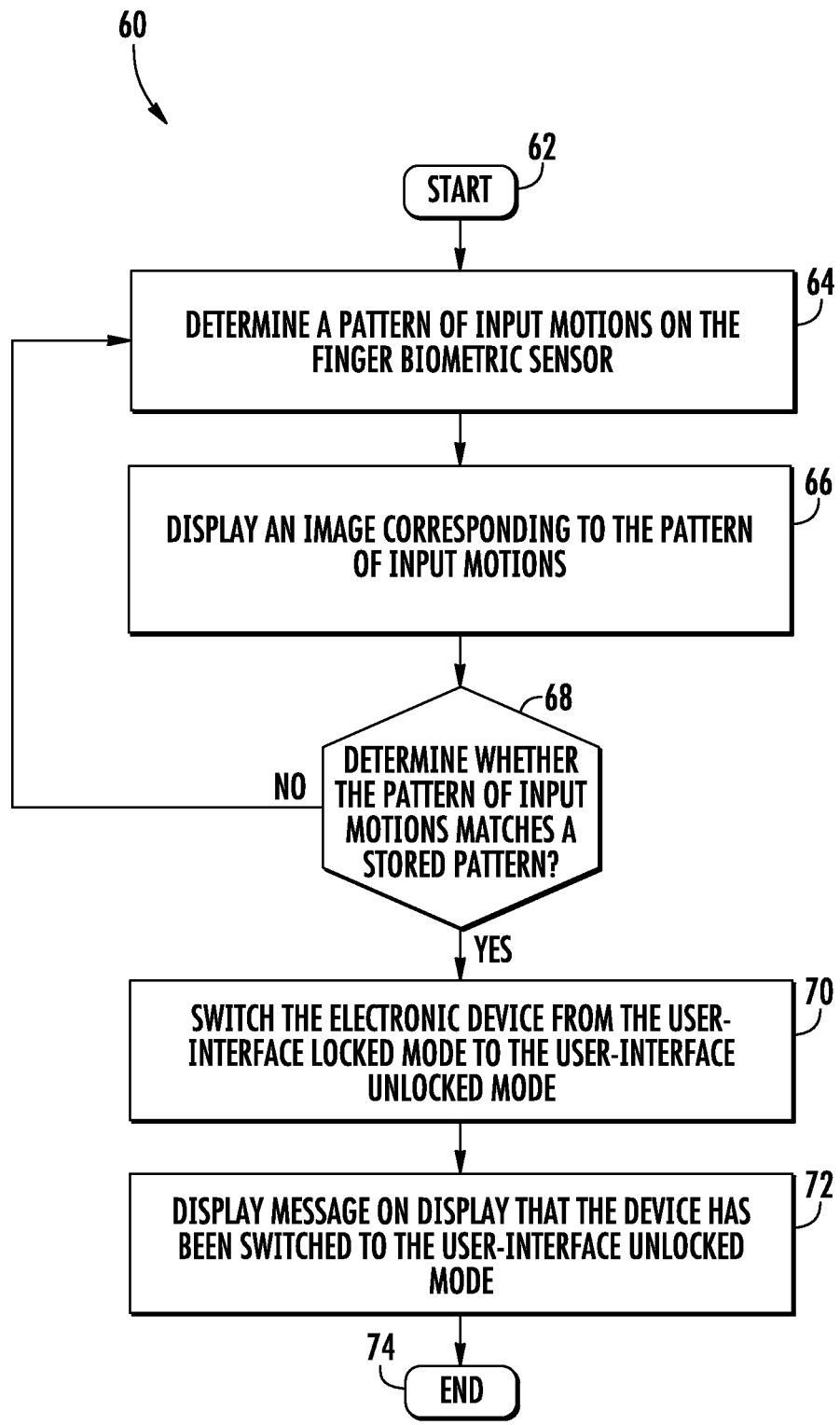
FIG. 3 is a flow chart of a method of switching between a user-interface locked mode and a user-interface unlocked mode according to the present invention.

Referring now additionally to the flowchart 60 in FIG. 3, further details of operation of an embodiment of the electronic device 20 are now described. Beginning at Block 62, the processor 22 determines a pattern of input motions on the finger biometric sensor 30 (Block 64). In other words, the processor 22 determines a pattern of input motions of the user's finger 40 from adjacent the finger biometric sensor 30. In some embodiments, the processor 22 may cooperate with the display 23 to prompt the user to position the user's finger 40 adjacent the finger biometric sensor 30 for determining of the pattern of input motions.

At Block 66, the processor 22 displays an image corresponding to the pattern of input motions. The processor determines, at Block 68, whether the pattern of input motions matches a stored pattern representing a user unlock code. The stored pattern representing the user unlock code may be stored in the memory 26, as will be appreciated by those skilled in the art. If the processor 22 determines that the pattern of input motions matches the stored pattern, the processor switches to the user-interface unlocked mode from the user-interface locked mode (Block 70). If, however, the processor 22 determines that the pattern of input motions does not match the stored pattern representing the unlock code, the electronic device 20 remains in the user-interface locked mode and the processor may again determine a pattern of input-motions on the finger biometric sensor 30 (Block 64). In some embodiments, after a threshold number of unsuccessful attempts to switch between the user-interface locked mode to the user-interface unlocked mode, the processor may stop determining a pattern of input motions. In other words, the user may be locked out of the electronic device 20 after a threshold number of unsuccessful unlock code attempts.

The processor 22 may display a message 27 on the display 23 that the device 20 has been switched from the user-interface locked mode to the user-interface unlocked mode (Block 72) (FIG. 1). The message 27 may be displayed for threshold time period, for example, a few seconds. Alternatively, the processor 22 may display a "home" screen without any banner or indication that the device 20 is in the user-interface locked mode, for example, when the processor performs the device function corresponding to the operation of the pushbutton switch.

In some embodiments, in the user-interface unlocked mode, the processor 22 may perform the corresponding device function responsive to the pushbutton switch 24. For example, the processor 22 may perform a home or menu function based upon operation of the pushbutton switch 24, which would not be performed in the user-interface locked mode. The method ends at Block 74.

Figure 4:
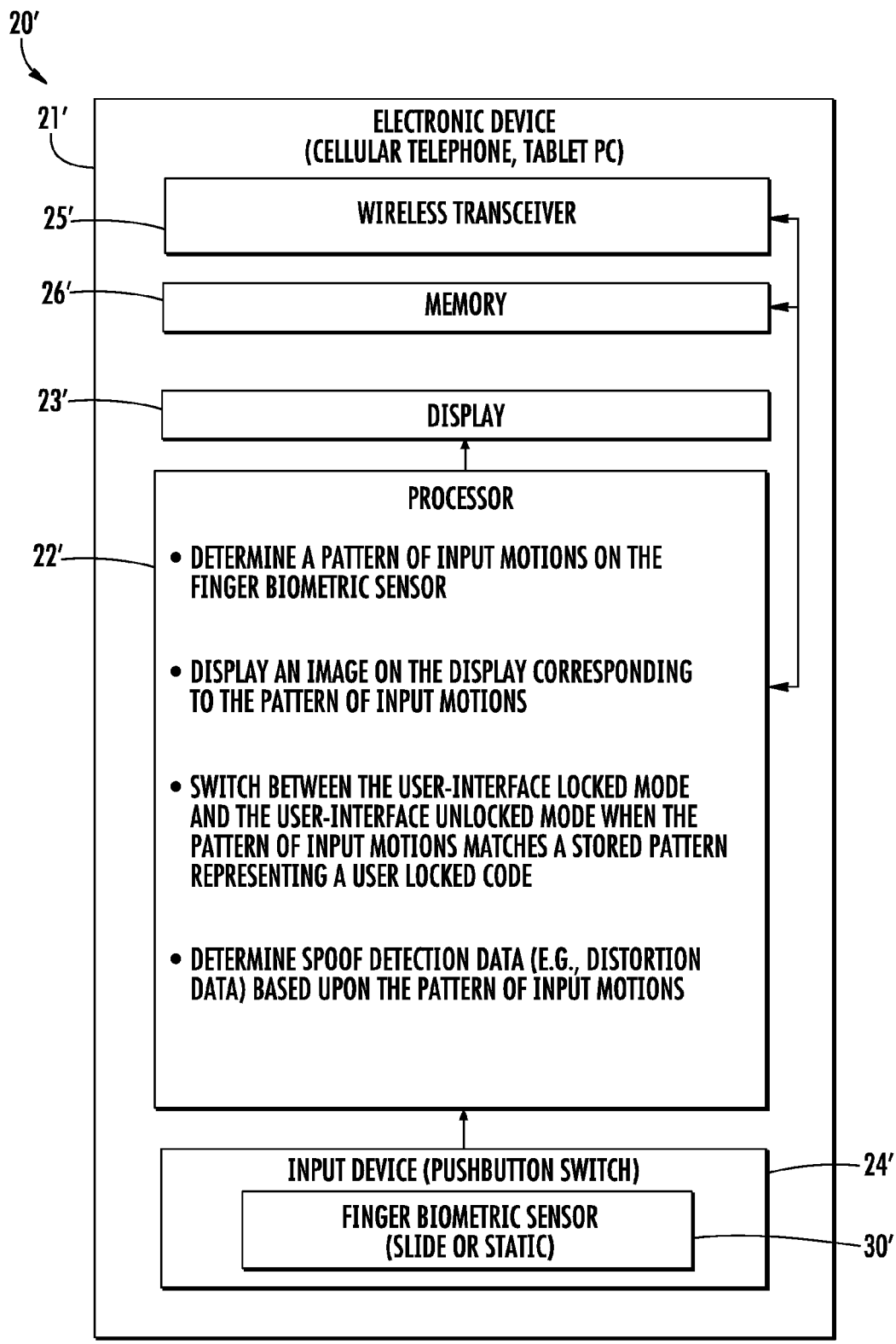
FIG. 4 is a schematic block diagram of an electronic device according to another embodiment of the present invention.
Figure 5:
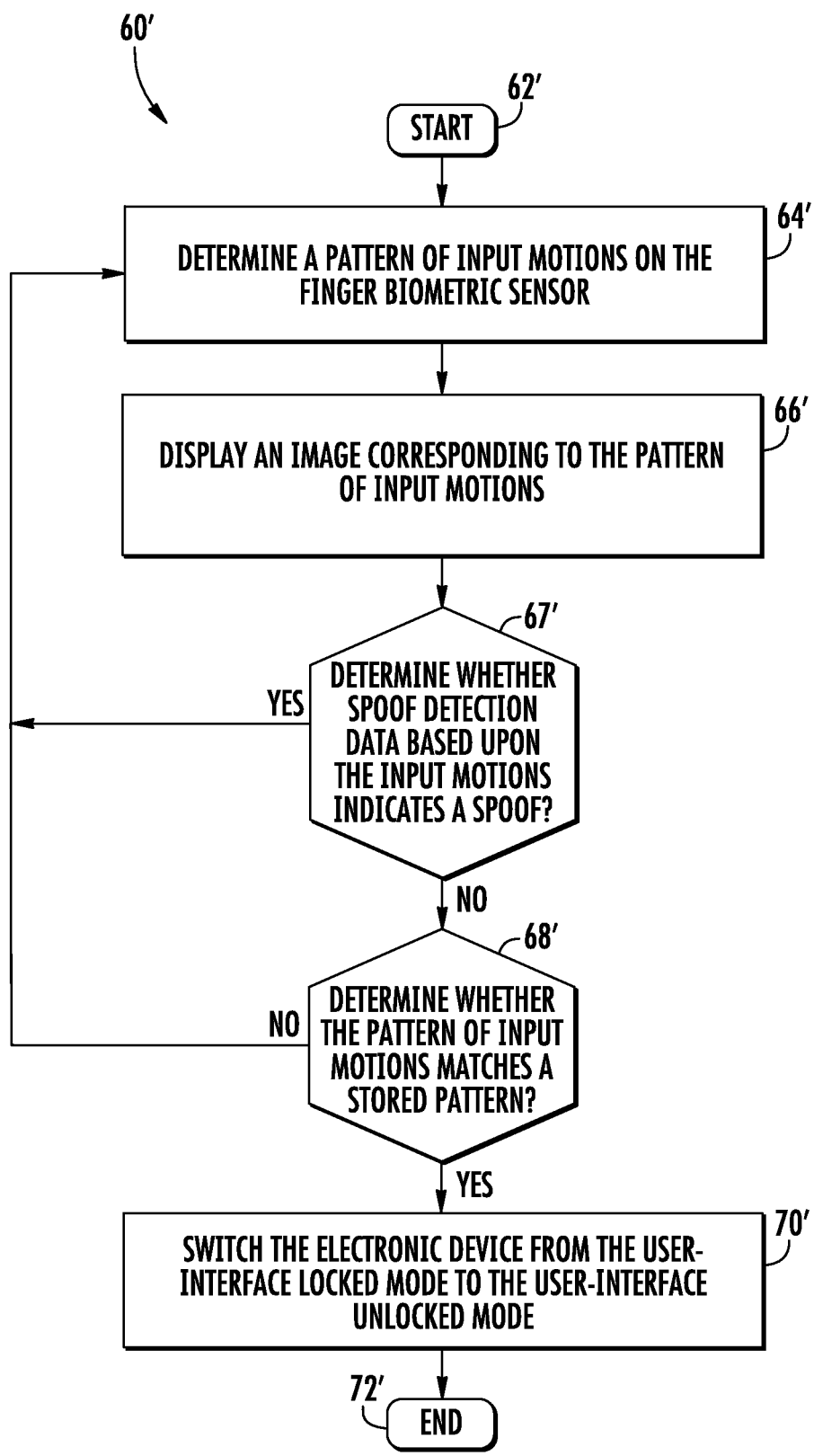
FIG. 5 is a flow chart of a method of switching between a user-interface locked mode and a user-interface unlocked mode using the electronic device of FIG. 4.

Referring now additionally to FIG. 4 and the flowchart 60' in FIG. 5, another embodiment of the electronic device 20' and operation thereof are now described. After determining the pattern of input motions of the finger biometric sensor 30' as described above with respect to FIG. 4 (Block 64'), and display an image on the display corresponding to the pattern of input motions (Block 66'), the processor 22' also cooperates with the finger biometric sensor 30' to determine spoof detection data based upon the input motions (Block 67'). The spoof detection data may include distortion data. As will be appreciated by those skilled in the art, as the user's finger 40' moves relative to the finger biometric sensor 30' when determining the pattern of input motions, the user's finger distorts. Thus, the spoof detection data, for example, the distortion data, may be used by the processor 22' to determine whether the user's finger 40' is representative of a live-finger or a spoof finger based upon the spoof detection data, and more particularly, the distortion of the user's finger. As will be appreciated by those skilled in the art, a live finger has certain biometric or other characteristics that allow differentiation with a spoof finger, and data representative of these characteristic may be used to determine whether a live finger has in fact been placed adjacent the finger biometric sensor 30'.

Of course, the spoof detection data may further include other types of data, and the processor 22' may determine the spoof detection data using any of a number of spoof detection techniques. For example, in one example spoof detection technique, the spoof detection data may include complex impedance data. The processor 22' may perform the spoof detection based upon acquired complex impedance data. As will be appreciated by those skilled in the art, a live finger has a complex impedance that can be distinguished from the complex impedance of a spoof finger. Further details of using complex impedance data for spoof detection are disclosed in U.S. Pat. No. 5,940,526 to Setlak, and assigned to the assignee of the present application, and the entire contents of which are herein incorporated by reference.

The processor 22' may determine the spoof detection data in parallel with or at the same time as displaying an image on the display 23' corresponding to the pattern of input motions (Block 66'). In other words, while the spoof detection data is illustratively determined after the displaying the image, it will be appreciated by those skilled in the art that these steps may be performed in parallel with each other or with additional or other method steps or processor functions.

If, at Block 67', the spoof detection data is determined to be representative of a live finger, the processor 22' determines, at Block 68', whether the pattern of input motions matches a stored pattern representing a user unlock code and, based upon a match, switches to the user-interface unlocked mode from the user-interface locked mode similarly to that described above with respect to FIGS. 2 and 3 (Block 70'). If, however, the processor 22' determines that the pattern of input motions does not match the stored pattern representing the unlock code, and/or the determined spoof detection data is representative of a spoof finger, the electronic device 20' remains in the user-interface locked mode and the processor may again determine a pattern of input motions on the finger biometric sensor 30' (Block 64'). In some embodiments, after a threshold number of unsuccessful attempts to switch between the user-interface locked mode to the user-interface unlocked mode, the processor 22' may stop determining a pattern of input motions.

In some embodiments, the processor 22' may generate or determine a spoof score based upon the spoof detection data and determine whether the acquired spoof detection data is representative of a live finger based upon the spoof score relative to a threshold. The threshold may be adjusted based upon a desired sensitivity or level of security, as will be appreciated by those skilled in the art.

In some embodiments, the spoof detection data may also be determined via operation of the pushbutton switch 24'. However, the corresponding device function may not be performed responsive to the operation of the pushbutton switch 24'. In other embodiments, for example, where the finger biometric sensor 30' is a slide sensor, the spoof detection data may be acquired upon sliding contact with the user's finger or object. The method ends at Block 72'.

Figure 6:
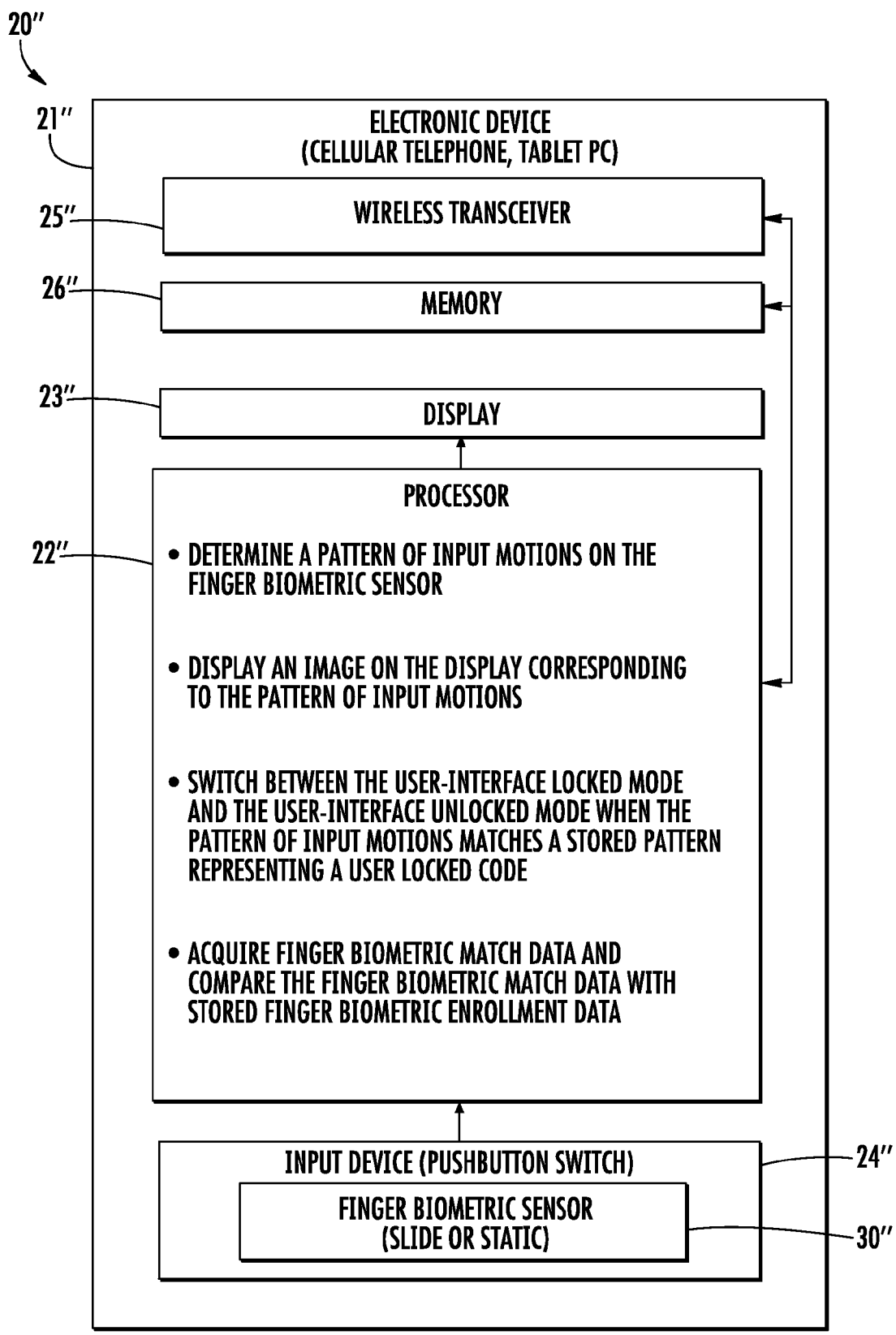
FIG. 6 is a schematic block diagram of an electronic device according to another embodiment of the present invention.
Figure 7:
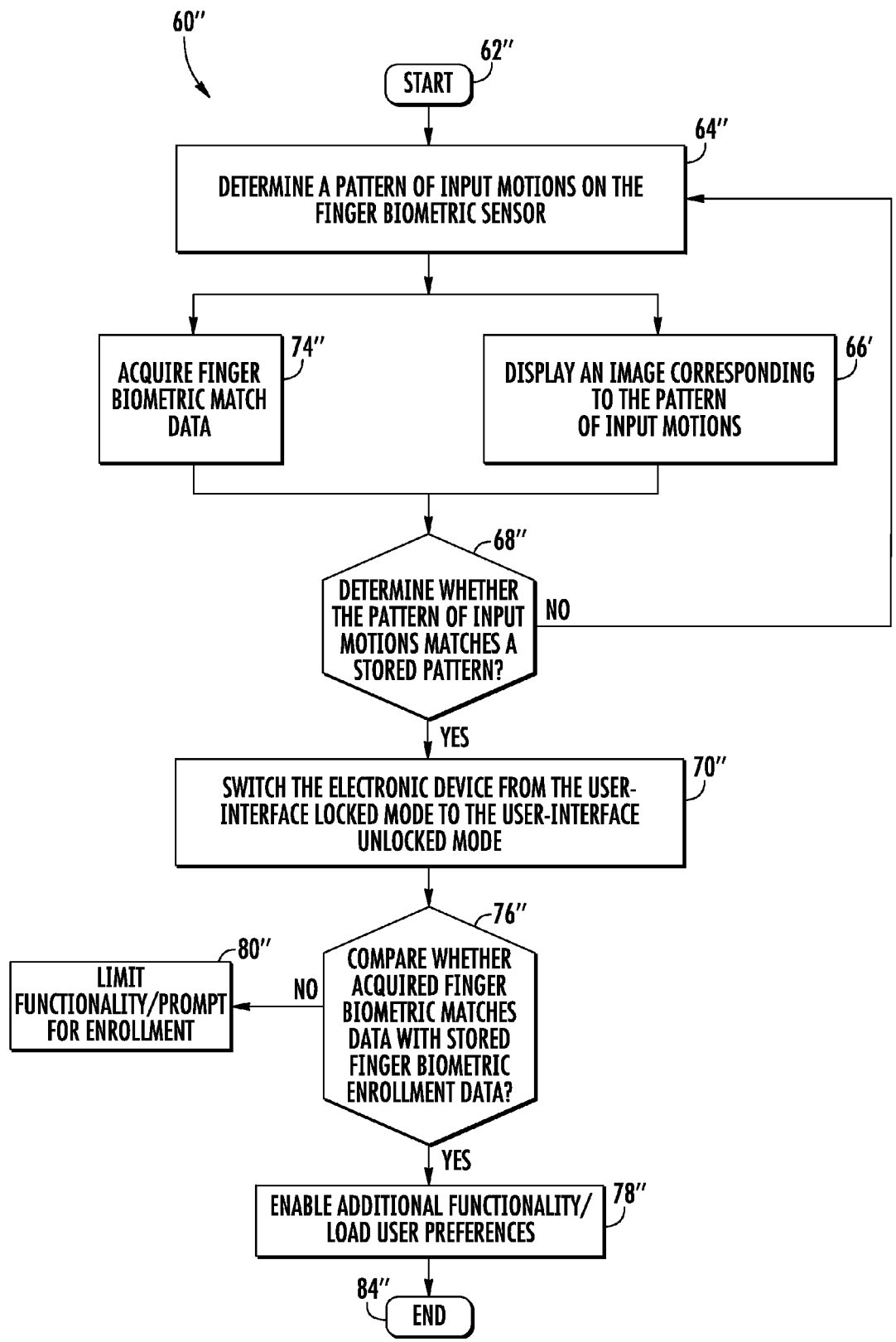
FIG. 7 is a flow chart of a method of switching between a user-interface locked mode and a user-interface unlocked mode using the electronic device of FIG. 6.
Figure 8:
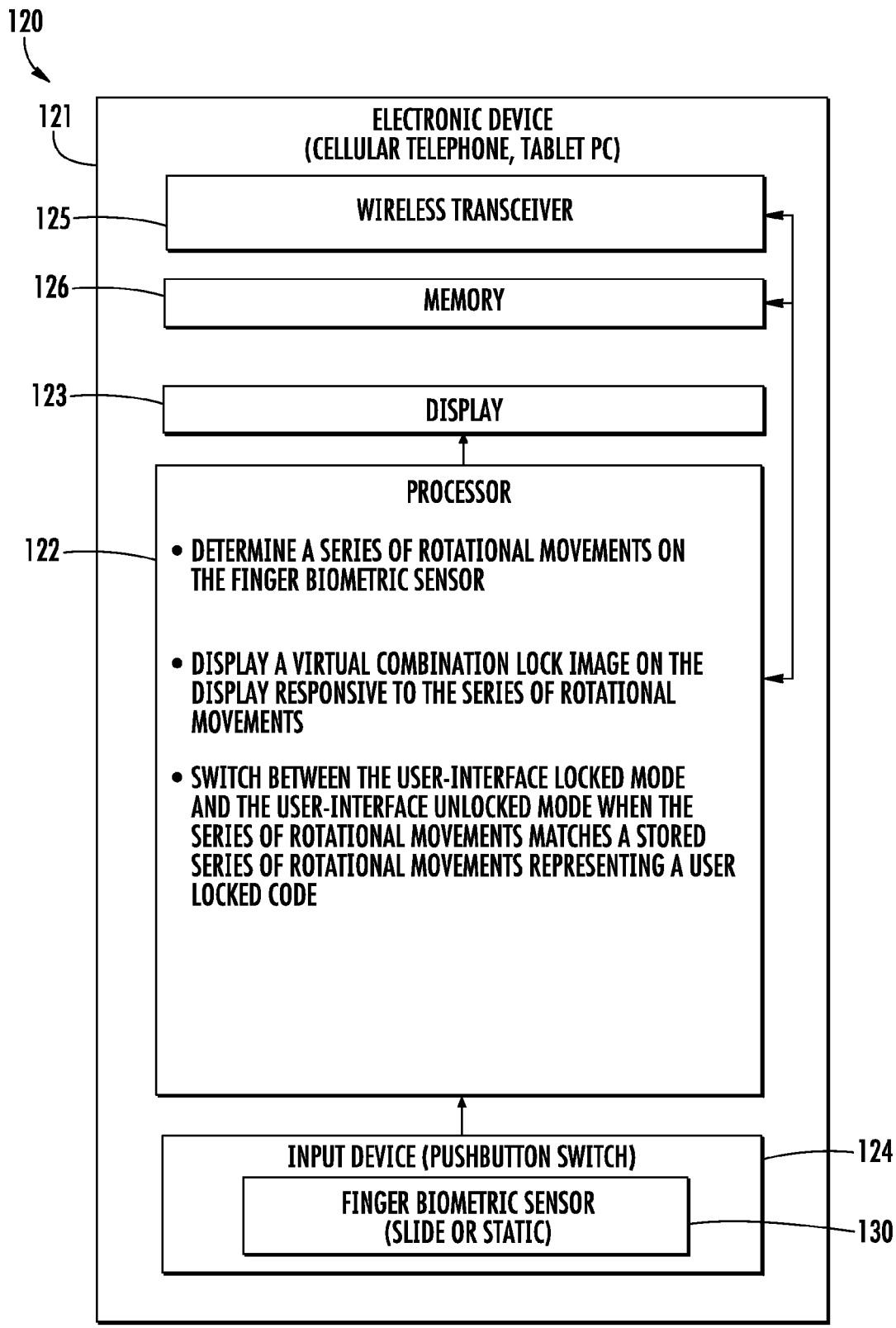
FIG. 8 is a schematic block diagram of an electronic device according to another embodiment of the present invention.

Referring now additionally to FIG. 6 and the flowchart 60" in FIG. 7, further details of operation of another embodiment of the electronic device 20" are now described. In the present embodiment and with respect to the embodiment described above with the respect to FIGS. 2 and 3, the processor 22" also cooperates with the finger biometric sensor 30" to acquire finger biometric match data (Block 74"). The finger biometric match data may be acquired based upon the determining of the pattern of input motions (Block 64"). Of course, the finger biometric match data may be acquired via a subsequent contact, e.g., sliding or static, of the user's finger 40" or an object adjacent the finger biometric sensor 30".

The acquired finger biometric match data may include fingerprint data, and more particularly, fingerprint minutae data, ridge and/or valley fingerprint image data, ridge flow data, finger pore data, etc. For example, the finger biometric sensor 30" may be a finger sensor as described in U.S. Pat. No. 5,953,441 to Setlak and/or as described in U.S. Pat. No.

6,927,581 to Gozzini, and assigned to the assignee of the present invention and the entire contents of which are herein incorporated by reference.

After displaying the image corresponding to the pattern of input motions (Block 66") and determining whether the pattern of input motions matches a stored pattern (Block 68"), the processor 22", at Block 76", compares the acquired finger biometric match data with stored finger biometric enrollment data stored in the memory 26". The stored finger biometric enrollment data may also be fingerprint data, for example, as noted above. As will be appreciated by those skilled in the art, the stored finger biometric enrollment data may acquired by any enrollment technique. In some embodiments, the processor 22" may prompt the user, via the display 23", subsequent to determining the pattern of input motions and displaying the image on the display corresponding to the pattern of input motions, to place the user's finger adjacent the finger biometric sensor 30" for matching.

The processor 22" may, upon a match between the acquired finger biometric match data and the stored finger biometric enrollment data, enable additional functionality (Block 78"). If the processor 22" does not find a match between the acquired finger biometric match data and the stored finger biometric enrollment data, the functionality of the electronic device 20" may be limited or not function at all. The processor 22" may also load user preferences corresponding to the user based upon a match of the finger biometric match data. Moreover, if, for example, a match is not found between the acquired finger biometric match data and the stored finger biometric enrollment data, the processor 22" may prompt the user to enroll finger biometric enrollment data (Block BO"). The method ends at Block 84".

The processor 22" may acquire the finger biometric match data and compare the acquired finger biometric match data with or at the same time as displaying an image on the display 23" corresponding to the pattern of input motions (Block 66") and determining whether the pattern of input motions matches a stored pattern (Block 68"). In other words, while the finger biometric match data is illustratively acquired and compared after the displaying the image and determining a match with the user unlock code, it will be appreciated by those skilled in the art that these steps may be performed in parallel with each other or with additional or other method steps or processor functions.

Referring now to FIGS. 8, and 9a-9c, in another embodiment, the processor 122 displays an image on the display 123 to correspond to a pattern of input motions that is illustratively in the form of a virtual combination lock 151. The processor 122 determines a pattern of input motions, for example, a pattern or series of rotational movements, on the finger biometric sensor 130.

Figure 9:
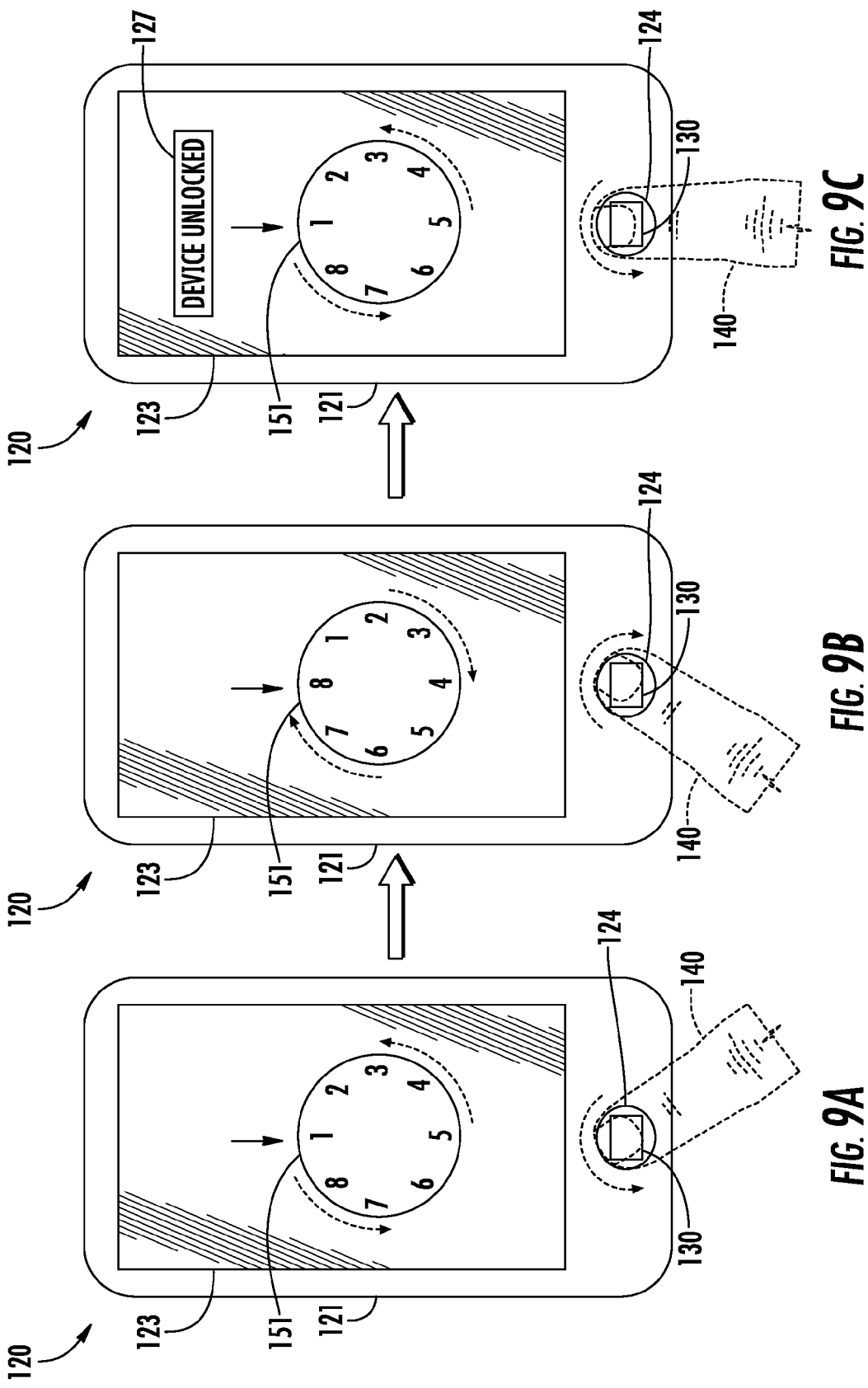
FIGS. 9a-9c are plan views of the electronic device of FIG. 9 displaying a virtual combination lock.
Figure 10:
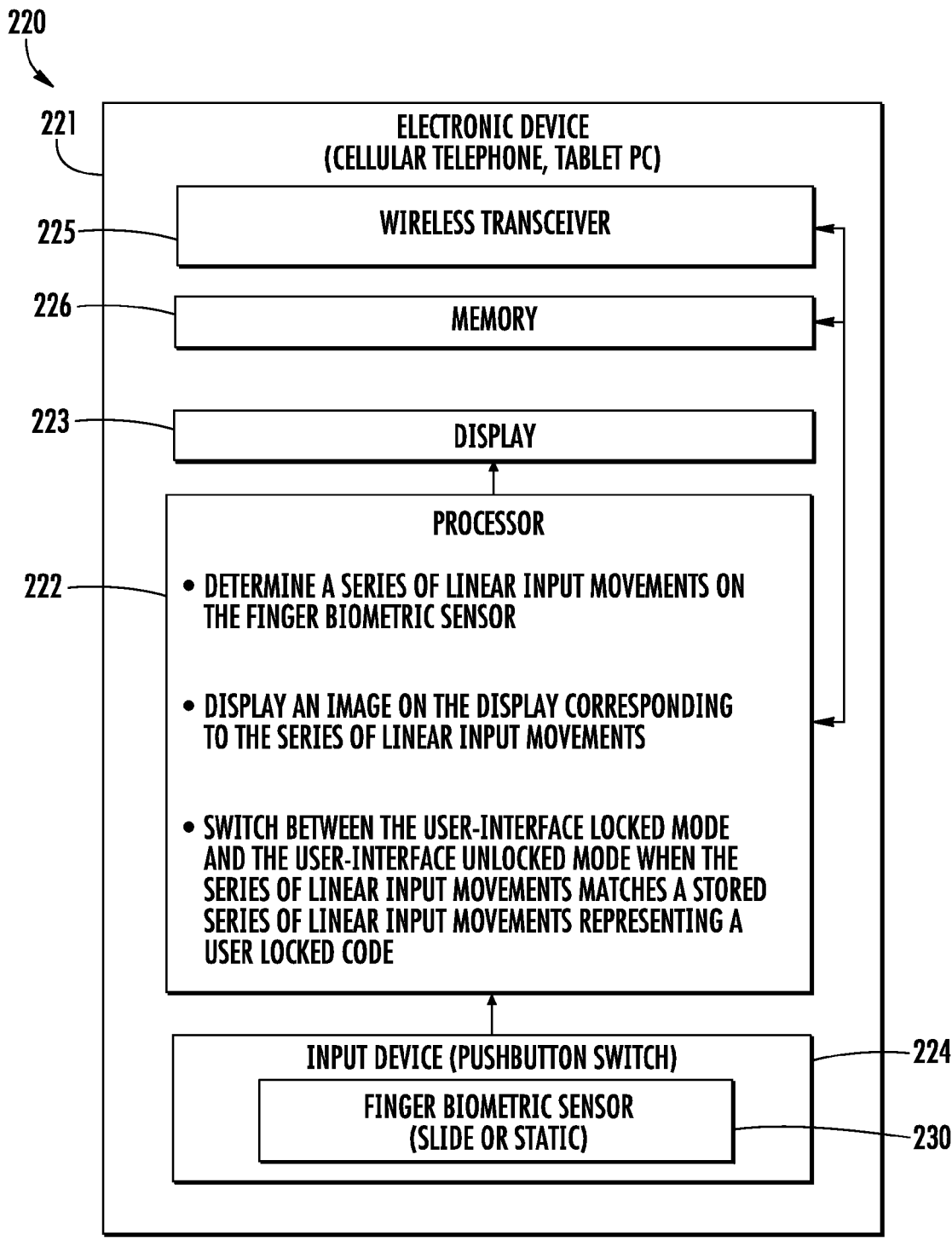
FIG. 10 is a schematic block diagram of an electronic device according to another embodiment of the present invention.

The processor 122 cooperates with the finger biometric sensor 130 so that the virtual combination lock image 151 is responsive to the pattern of input motions or rotational movements. In other words, the virtual tumbler of the virtual combination lock image 151 rotates corresponding to rotation of the user's finger 140 adjacent the finger biometric sensor 130. The user unlock code may correspond, for example, correspond to a left rotational movement or turn to a first number (FIG. 9a), followed by a right rotational movement or turn to a second number (FIG. 9b), and followed by another left rotational movement to a third number (FIG. 9c). This operation is similar to that of a combination lock, as will be appreciated by those skilled in the art.

If, as described above, the pattern or series of rotational movements matches a stored pattern or stored series of rotational movements, the processor 122 switches to the user-interface unlocked mode. An indication 127 that the electronic device 120 has been switched from the user-interface locked mode to the user-interface unlocked mode may be displayed on the display 123.

Similar to the embodiments described above, a housing 121 carries the processor 122 and the pushbutton switch 124. A display 123, memory 126, and a wireless transceiver 125 are coupled to the processor 122. The finger biometric sensor 130 may be carried by the pushbutton switch 124 and is also coupled to the processor 122.

Referring now to FIGS. 10, and 11a-11c, in another embodiment, the processor 222 displays an image on the display 223 to correspond to a pattern of input motions that is illustratively in the form of connection points 252a-252i to be connected with a pattern of input motions.

The processor 222 determines a pattern of input motions, for example, a pattern or series of linear movements, on the finger biometric sensor 230 to connect the connection points in a pattern that representing the user unlock code.

The processor 222 cooperates with the finger biometric sensor 230 so that the connection points 252a-252i are responsive to the pattern of input motions, for example, by displaying a trace highlighting movement of the user's finger 240. For example, the user unlock code may correspond to a movement from the first connection point 252a through the second connection point 252b (FIG. 11a) and to the eighth connection point 252h (FIG. 11c) via the fifth connection point 252e (FIG. 11b). Of course, the connection points 252a-252i may be responsive to the input movements by highlighting, e.g. bolding, connection points in the pattern of input motions.

If, as described above, the pattern or series of linear movements matches a stored pattern or stored series of linear movements, the processor 222 switches to the user-interface unlocked mode. An indication 227 that the electronic device 220 has been switched from the user-interface locked mode to the user-interface unlocked mode may be displayed on the display 223.

Similar to the embodiments described above, a housing 221 carries the processor 222 and the pushbutton switch 224. A display 223, memory 226, and a wireless transceiver 225 are coupled to the processor 222. The finger biometric sensor 230 may be carried by the pushbutton switch 224 and is also coupled to the processor 222.

It will be appreciated that while two different images corresponding to two different types of input motions have been described, any type of image may be displayed that corresponds to any type of or combination of input motions. For example, the processor 22 may determine a pattern of input motions that may include both rotational movements and linear movements, and one or more images corresponding to both the rotational and linear movements may be displayed on the display 23.

It should be understood that while the embodiments described may be particularly useful for both spoof detecting and matching operations, the matching operation may be performed independently of the spoof detecting operation, and vice versa. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a finger biometric sensor;
a display; and
a processor coupled to said finger biometric sensor and said display and being switchable between a user-interface locked mode and a user-interface unlocked mode, said processor capable of
determining a pattern of input motions on said finger biometric sensor,
displaying an image on said display corresponding to the pattern of input motions, and
switching between the user-interface locked mode and the user-interface unlocked mode when the pattern of input motions matches a stored pattern representing a user unlock code.

2. The electronic device of claim 1, wherein said processor is capable of determining spoof detection data based upon the pattern of input motions.

3. The electronic device of claim 2, wherein the spoof detection data comprises distortion data.

4. The electronic device of claim 1, wherein said processor is capable of displaying the image on said display as a virtual combination lock responsive to the pattern of input motions.

5. The electronic device of claim 4, wherein the stored pattern representing the user unlock code comprises a series of rotational movements.

6. The electronic device of claim 1, wherein the stored pattern representing the user unlock code comprises a series of linear movements.

7. The electronic device of claim 1, wherein said processor is capable of acquiring finger biometric match data and comparing the finger biometric match data with stored finger biometric enrollment data.

8. The electronic device of claim 1, further comprising a user input device coupled to said processor; and wherein said processor, when in the user-interface unlocked mode, is capable of performing a corresponding device function responsive to said user input device.

9. The electronic device of claim 8, wherein said user input device comprises a finger-operated input device carrying said finger biometric sensor.

10. The electronic device of claim 1, further comprising a wireless transceiver coupled to said processor.

11. An electronic device comprising:
a housing;
a finger biometric sensor carried by said housing;
a display carried by said housing;
a wireless transceiver carried by said housing;
a user input device carried by said housing; and
a processor coupled to said finger biometric sensor, said display, said wireless transceiver, and said user input device, and being switchable between a user-interface locked mode and a user-interface unlocked mode;
said processor capable of
determining a pattern of input motions on said finger biometric sensor,
displaying an image on said display corresponding to the pattern of input motions,
switching between the user-interface locked mode and the user-interface unlocked mode when the pattern of input motions matches a stored pattern representing a user unlock code, and
performing a corresponding device function responsive to said user input device when in the user-interface unlocked mode.

12. The electronic device of claim 11, wherein said processor is capable of determining spoof detection data based upon the pattern of input motions.

13. The electronic device of claim 12, wherein the spoof detection data comprises distortion data.

14. The electronic device of claim 11, wherein said processor is capable of displaying the image on said display as a virtual combination lock responsive to the pattern of input motions.

15. The electronic device of claim 14, wherein the stored pattern representing the user unlock code comprises a series of rotational movements.

16. The electronic device of claim 11, wherein the stored pattern representing the user unlock code comprises a series of linear movements.

17. The electronic device of claim 11, wherein said processor is capable of acquiring finger biometric match data and comparing the finger biometric match data with stored finger biometric enrollment data.

18. The electronic device of claim 11, wherein said user input device comprises a finger-operated input device carrying said finger biometric sensor.

19. A method of switching between a user-interface locked mode and a user-interface unlocked mode of an electronic device comprising a finger biometric sensor, a display, and a processor coupled to the finger biometric sensor and the display, the method comprising:
using the processor to
determine a pattern of input motions on the finger biometric sensor,
display an image on the display corresponding to the pattern of input motions, and
switch between the user-interface locked mode and the user-interface unlocked mode when the pattern of input motions matches a stored pattern representing a user unlock code.

20. The method of claim 19, further comprising using the processor to determine spoof detection data based upon the pattern of input motions.

21. The method of claim 20, wherein the spoof detection data comprises distortion data.

22. The method of claim 19, wherein the processor displays the image on the display as a virtual combination lock responsive to the pattern of input motions.

23. The method of claim 22, wherein the stored pattern representing the user unlock code comprises a series of rotational movements.

24. The method of claim 19, wherein the stored pattern representing the user unlock code comprises a series of linear movements.

25. The method of claim 19, further comprising using the processor to acquire finger biometric match data and compare the finger biometric match data with stored finger biometric enrollment data.

26. The method of claim 19, further comprising using the processor, when in the user-interface unlocked mode, to perform a corresponding device function responsive to a user input device coupled to the processor.

* * * * *